(12) United States Patent
Trombetta et al.

(10) Patent No.: US 11,439,918 B2
(45) Date of Patent: Sep. 13, 2022

(54) PLAYER TO SPECTATOR HANDOFF AND OTHER SPECTATOR CONTROLS

(71) Applicant: SONY INTERACTIVE ENTERTAINMENT LLC, San Mateo, CA (US)

(72) Inventors: Steven Trombetta, San Mateo, CA (US); Christopher Thielbar, San Francisco, CA (US); James Fairbairn, Novato, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 17/015,845

(22) Filed: Sep. 9, 2020

(65) Prior Publication Data

US 2020/0406152 A1   Dec. 31, 2020

Related U.S. Application Data

(63) Continuation of application No. 15/908,345, filed on Feb. 28, 2018, now Pat. No. 10,792,576.

(51) Int. Cl.
   *A63F 13/85* (2014.01)
   *A63F 13/86* (2014.01)
   (Continued)

(52) U.S. Cl.
   CPC .............. *A63F 13/86* (2014.09); *A63F 13/35* (2014.09); *A63F 13/358* (2014.09); *A63F 13/48* (2014.09)

(58) Field of Classification Search
   CPC ........ A63F 13/86; A63F 13/35; A63F 13/358; A63F 13/48
   See application file for complete search history.

(56) References Cited

U.S. PATENT DOCUMENTS

| | | |
|---|---|---|
| 5,729,471 A | 3/1998 | Jain et al. |
| 5,995,518 A | 11/1999 | Burns et al. |

(Continued)

FOREIGN PATENT DOCUMENTS

| | | |
|---|---|---|
| CN | 110201395 A | 9/2019 |
| CN | 110201398 A | 9/2019 |

(Continued)

OTHER PUBLICATIONS

NAHL ranked #1 by The Junior Hockey News_North American Hockey League_NAHL.pdf, http://nahl.com/news/story.cfm?id=15090, Jul. 16, 2015 (Year: 2015).

(Continued)

*Primary Examiner* — Omkar A Deodhar
*Assistant Examiner* — Shauna-Kay Hall
(74) *Attorney, Agent, or Firm* — Polsinelli LLP

(57) ABSTRACT

A video game has at least one player client with control over an aspect of a shared virtual environment. The video game also has at least one spectator client with limited to no control over the shared virtual environment. For example, the spectator client's control may be limited to the game server generating audience cheers or boos in response to spectator input during gameplay. In response to detection of a trigger event by a game server, the player and spectator may switch roles. The client switching from spectator to player experiences an increase in network transfer quality from the game server to help provide smooth gameplay. The client switching from player to spectator faces a decrease in network transfer properties to compensate.

19 Claims, 7 Drawing Sheets

(51) Int. Cl.
  *A63F 13/358* (2014.01)
  *A63F 13/48* (2014.01)
  *A63F 13/35* (2014.01)

(56) References Cited

U.S. PATENT DOCUMENTS

| | | |
|---|---|---|
| 6,415,317 B1 | 7/2002 | Yelon et al. |
| 6,546,421 B1 | 4/2003 | Wynblatt et al. |
| 6,631,522 B1 | 10/2003 | Erdelyi |
| 6,877,134 B1 | 4/2005 | Fuller et al. |
| 7,499,475 B2 | 3/2009 | Kashiwagi et al. |
| 8,025,572 B2 | 9/2011 | Spanton et al. |
| 8,187,104 B2 | 5/2012 | Pearce |
| 8,202,167 B2 | 6/2012 | Ackely et al. |
| 8,645,844 B1 | 2/2014 | Strobel et al. |
| 8,702,520 B2 | 4/2014 | Seelig et al. |
| 9,216,356 B2 | 12/2015 | Grier |
| 9,233,305 B2 | 1/2016 | Laakkonen et al. |
| 9,433,855 B1 | 9/2016 | Keeker et al. |
| 9,473,825 B2 | 10/2016 | Gossweiler et al. |
| 9,497,424 B2 | 11/2016 | Kosseifi et al. |
| 9,782,678 B2 | 10/2017 | Long et al. |
| 9,814,987 B1 | 11/2017 | Lawson |
| 9,860,477 B2 | 1/2018 | Kummer et al. |
| 9,871,997 B2 | 1/2018 | Kosseifi et al. |
| 9,968,856 B1 | 5/2018 | Ninoles et al. |
| 10,277,813 B1 | 4/2019 | Thomas et al. |
| 10,471,360 B2 | 11/2019 | Trombetta |
| 10,751,623 B2 | 8/2020 | Trombetta |
| 10,765,938 B2 | 9/2020 | Trombetta |
| 10,765,957 B2 | 9/2020 | Trombetta |
| 10,792,576 B2 | 10/2020 | Trombetta |
| 10,792,577 B2 | 10/2020 | Trombetta |
| 10,814,228 B2 | 10/2020 | Trombetta |
| 10,818,142 B2 | 10/2020 | Trombetta |
| 10,953,322 B2 | 3/2021 | Trombetta |
| 10,953,335 B2 | 3/2021 | Thielbar |
| 11,065,548 B2 | 7/2021 | Trombetta |
| 11,241,630 B2 | 2/2022 | Trombetta |
| 2002/0034980 A1 | 3/2002 | Lemmons et al. |
| 2002/0107040 A1 | 8/2002 | Crandall et al. |
| 2003/0177347 A1 | 9/2003 | Schneier et al. |
| 2003/0220143 A1 | 11/2003 | Shteyn et al. |
| 2004/0147306 A1 | 7/2004 | Randall et al. |
| 2004/0189701 A1 | 9/2004 | Badt |
| 2004/0257994 A1 | 12/2004 | Paskett et al. |
| 2004/0266535 A1 | 12/2004 | Reeves |
| 2005/0020359 A1 | 1/2005 | Ackely et al. |
| 2005/0026699 A1 | 2/2005 | Kinzer et al. |
| 2006/0105827 A1 | 5/2006 | Metzger et al. |
| 2006/0247060 A1 | 11/2006 | Hanson et al. |
| 2006/0287096 A1 | 12/2006 | O'Kelley et al. |
| 2007/0018952 A1 | 1/2007 | Arseneau et al. |
| 2007/0021058 A1 | 1/2007 | Aresneau et al. |
| 2007/0070914 A1 | 3/2007 | Abigail |
| 2007/0117617 A1 | 5/2007 | Spanton et al. |
| 2007/0117635 A1 | 5/2007 | Spanton et al. |
| 2007/0149288 A1 | 6/2007 | Nickell et al. |
| 2007/0191102 A1 | 8/2007 | Coliz et al. |
| 2007/0248261 A1 | 10/2007 | Zhou et al. |
| 2008/0079752 A1 | 4/2008 | Gates et al. |
| 2008/0113815 A1 | 5/2008 | Weingardt et al. |
| 2008/0119286 A1 | 5/2008 | Brunstetter et al. |
| 2008/0200254 A1 | 8/2008 | Cayce et al. |
| 2009/0036214 A1 | 2/2009 | Dahl |
| 2009/0042646 A1 | 2/2009 | Sarkar et al. |
| 2009/0082110 A1 | 3/2009 | Relyea et al. |
| 2009/0144448 A1 | 6/2009 | Smith |
| 2009/0208181 A1 | 8/2009 | Cottrell |
| 2009/0225828 A1 | 9/2009 | Perlman et al. |
| 2009/0271821 A1 | 10/2009 | Zalewski |
| 2010/0099330 A1 | 4/2010 | Digiovanni |
| 2010/0100512 A1 | 4/2010 | Brodin et al. |
| 2010/0240443 A1 | 9/2010 | Baerlocher et al. |
| 2011/0092282 A1 | 4/2011 | Gary |
| 2011/0207523 A1 | 8/2011 | Filipour et al. |
| 2011/0250939 A1 | 10/2011 | Hobler |
| 2011/0263332 A1 | 10/2011 | Mizrachi |
| 2011/0263333 A1* | 10/2011 | Dokei .................. A63F 13/795 463/42 |
| 2011/0275431 A1 | 11/2011 | Hirzel et al. |
| 2012/0093481 A1 | 4/2012 | McDowell et al. |
| 2012/0142411 A1 | 6/2012 | Thompson et al. |
| 2012/0283017 A1 | 11/2012 | Ahiska et al. |
| 2013/0002949 A1 | 1/2013 | Raveendran et al. |
| 2013/0007013 A1 | 1/2013 | Geisner et al. |
| 2013/0083173 A1 | 4/2013 | Geisner et al. |
| 2013/0123019 A1 | 5/2013 | Sullivan et al. |
| 2013/0231189 A1 | 9/2013 | Beeler |
| 2013/0254680 A1 | 9/2013 | Buhr et al. |
| 2013/0296051 A1 | 11/2013 | Gault et al. |
| 2013/0324239 A1 | 12/2013 | Ur et al. |
| 2013/0331192 A1 | 12/2013 | Betti et al. |
| 2014/0004951 A1 | 1/2014 | Kern et al. |
| 2014/0031121 A1 | 1/2014 | Kern et al. |
| 2014/0087846 A1 | 3/2014 | Bryan et al. |
| 2014/0087851 A1 | 3/2014 | Low et al. |
| 2014/0113718 A1 | 4/2014 | Norman et al. |
| 2014/0142921 A1 | 5/2014 | Gleadall et al. |
| 2014/0171039 A1 | 6/2014 | Bjontegard |
| 2014/0171182 A1 | 6/2014 | Versaci |
| 2014/0179440 A1 | 6/2014 | Perry |
| 2014/0228112 A1 | 8/2014 | Laakkonen et al. |
| 2014/0274307 A1 | 9/2014 | Gonzalez |
| 2014/0274368 A1 | 9/2014 | Cotter |
| 2014/0274370 A1 | 9/2014 | Shah |
| 2014/0297408 A1 | 10/2014 | Zabala |
| 2014/0331265 A1 | 11/2014 | Mozell et al. |
| 2015/0005052 A1 | 1/2015 | Harrington et al. |
| 2015/0011283 A1 | 1/2015 | Sanford et al. |
| 2015/0018990 A1 | 1/2015 | Shachar et al. |
| 2015/0024850 A1 | 1/2015 | Kokami et al. |
| 2015/0113548 A1 | 4/2015 | Stern et al. |
| 2015/0141140 A1 | 5/2015 | Lampe et al. |
| 2015/0238859 A1 | 8/2015 | Fear |
| 2015/0248792 A1 | 9/2015 | Abovitz et al. |
| 2015/0281029 A1 | 10/2015 | Callahan et al. |
| 2015/0348373 A1 | 12/2015 | Weingardt et al. |
| 2015/0375117 A1 | 12/2015 | Thompson et al. |
| 2016/0051895 A1 | 2/2016 | Hood |
| 2016/0193530 A1 | 7/2016 | Parker et al. |
| 2016/0214012 A1 | 7/2016 | Nishikawa |
| 2016/0243450 A1 | 8/2016 | Cotter |
| 2016/0253865 A1 | 9/2016 | Men et al. |
| 2016/0286244 A1 | 9/2016 | Chang et al. |
| 2016/0310843 A1 | 10/2016 | Webb |
| 2016/0365121 A1 | 12/2016 | DeCaprio |
| 2016/0373499 A1 | 12/2016 | Wagner et al. |
| 2017/0001111 A1 | 1/2017 | Willette et al. |
| 2017/0001112 A1 | 1/2017 | Gilmore et al. |
| 2017/0003740 A1 | 1/2017 | Verfaillie et al. |
| 2017/0003784 A1 | 1/2017 | Garg et al. |
| 2017/0006074 A1 | 1/2017 | Oates |
| 2017/0072324 A1 | 3/2017 | Navok et al. |
| 2017/0113143 A1 | 4/2017 | Marr |
| 2017/0157512 A1 | 6/2017 | Long et al. |
| 2017/0182426 A1 | 6/2017 | Loeb et al. |
| 2017/0209795 A1 | 7/2017 | Harvey et al. |
| 2017/0266549 A1 | 9/2017 | Paradise |
| 2017/0266552 A1 | 9/2017 | Paradise et al. |
| 2017/0270751 A1 | 9/2017 | Paradise |
| 2017/0282075 A1 | 10/2017 | Michot et al. |
| 2017/0304724 A1 | 10/2017 | Cotter |
| 2017/0332131 A1 | 11/2017 | Opsenica et al. |
| 2017/0354875 A1 | 12/2017 | Marks et al. |
| 2017/0374402 A1 | 12/2017 | Pogorelik et al. |
| 2018/0001199 A1 | 1/2018 | Gary |
| 2018/0077438 A1 | 3/2018 | Hensen et al. |
| 2018/0139257 A1 | 5/2018 | Ninoles et al. |
| 2018/0167656 A1 | 6/2018 | Ortiz et al. |
| 2018/0192144 A1 | 7/2018 | McElroy |
| 2018/0250598 A1 | 9/2018 | Trombetta |
| 2018/0250600 A1 | 9/2018 | Trombetta |
| 2018/0367820 A1 | 12/2018 | Abulikemu |

(56) References Cited

U.S. PATENT DOCUMENTS

| | | | |
|---|---|---|---|
| 2019/0099675 A1* | 4/2019 | Khan | A63F 13/212 |
| 2019/0102941 A1* | 4/2019 | Khan | G06T 19/003 |
| 2019/0118098 A1 | 4/2019 | Payzer et al. | |
| 2019/0262705 A1 | 8/2019 | Trombetta | |
| 2019/0262706 A1 | 8/2019 | Trombetta | |
| 2019/0262712 A1 | 8/2019 | Trombetta | |
| 2019/0262713 A1 | 8/2019 | Trombetta | |
| 2019/0262717 A1 | 8/2019 | Thielbar | |
| 2019/0262720 A1 | 8/2019 | Trombetta | |
| 2019/0262723 A1 | 8/2019 | Trombetta | |
| 2019/0262724 A1 | 8/2019 | Trombetta | |
| 2019/0262727 A1 | 8/2019 | Trombetta | |
| 2019/0266845 A1 | 8/2019 | Trombetta | |
| 2020/0179812 A1 | 6/2020 | Trombetta | |
| 2020/0384364 A1 | 12/2020 | Trombetta | |
| 2020/0398157 A1 | 12/2020 | Trombetta | |
| 2020/0398169 A1 | 12/2020 | Trombetta | |
| 2021/0016190 A1 | 1/2021 | Trombetta | |
| 2021/0043044 A1 | 2/2021 | Trombetta | |
| 2021/0052982 A1 | 2/2021 | Trombetta | |
| 2021/0178257 A1 | 6/2021 | Trombetta | |
| 2021/0205711 A1 | 7/2021 | Thielbar | |
| 2021/0346809 A1 | 11/2021 | Trombetta | |

FOREIGN PATENT DOCUMENTS

| | | |
|---|---|---|
| CN | 110201399 A | 9/2019 |
| CN | 110201401 A | 9/2019 |
| CN | 110201402 A | 9/2019 |
| CN | 110201404 A | 9/2019 |
| CN | 110573221 A | 12/2019 |
| CN | 111971097 A | 11/2020 |
| CN | 112423854 A | 2/2021 |
| CN | 112423855 A | 2/2021 |
| CN | 112543669 A | 3/2021 |
| EP | 3 058 996 | 8/2016 |
| EP | 3 758 814 | 1/2021 |
| EP | 3 758 816 | 1/2021 |
| EP | 3 758 818 | 1/2021 |
| EP | 3 758 819 | 1/2021 |
| EP | 3 758 821 | 1/2021 |
| EP | 3 759 930 | 1/2021 |
| EP | 3 759 934 | 1/2021 |
| EP | 3 758 820 | 2/2021 |
| JP | 2021-514748 | 6/2021 |
| JP | 2021-514749 | 6/2021 |
| JP | 2021-514750 | 6/2021 |
| JP | 2021-514751 | 6/2021 |
| JP | 2021-514752 | 6/2021 |
| JP | 2021-514753 | 6/2021 |
| JP | 2021-514754 | 6/2021 |
| JP | 2021-515485 | 6/2021 |
| JP | 2021-516087 | 7/2021 |
| JP | 2021-516088 | 7/2021 |
| KR | 10-2020-0126975 | 11/2020 |
| KR | 10-2020-0127169 | 11/2020 |
| KR | 10-2020-0127172 | 11/2020 |
| KR | 10-2020-0127173 | 11/2020 |
| KR | 10-2020-0128523 | 11/2020 |
| KR | 10-2020-0135946 | 12/2020 |
| KR | 10-2020-0136894 | 12/2020 |
| WO | WO 2010/030313 | 3/2010 |
| WO | WO 2014/109435 | 7/2014 |
| WO | WO 2016/048204 | 3/2016 |
| WO | WO 2016/201333 | 12/2016 |
| WO | WO 2017/004433 | 1/2017 |
| WO | WO 2018/004812 | 1/2018 |
| WO | WO 2018/160274 | 9/2018 |
| WO | WO 2018/165191 | 9/2018 |
| WO | WO 2019/168614 | 9/2019 |
| WO | WO 2019/168615 | 9/2019 |
| WO | WO 2019/168619 | 9/2019 |
| WO | WO 2019/168620 | 9/2019 |
| WO | WO 2019/168630 | 9/2019 |
| WO | WO 2019/168631 | 9/2019 |
| WO | WO 2019/168636 | 9/2019 |
| WO | WO 2019/168637 | 9/2019 |
| WO | WO 2019/168638 | 9/2019 |
| WO | WO 2019/168646 | 9/2019 |

OTHER PUBLICATIONS

PCT Application No. PCT/US2018/013378 International Preliminary Report On Patentability dated Sep. 3, 2019.
PCT Application No. PCT/US2018/013378 International Search Report and Written Opinion dated Mar. 8, 2018.
PCT Application No. PCT/US2018/021197 International Preliminary Report on Patentability dated Sep. 10, 2020.
PCT Application No. PCT/US2018/021197 International Search Report and Written Opinion dated May 30, 2018.
PCT Application No. PCT/US2019/015120 International Preliminary Report on Patentability dated Sep. 1, 2020.
PCT Application No. PCT/US2019/015120 International Search Report and Written Opinion dated Apr. 15, 2019.
PCT Application No. PCT/US2019/015273 International Preliminary Report on Patentability dated Sep. 1, 2020.
PCT Application No. PCT/US2019/015273 International Search Report and Written Opinion dated Apr. 23, 2019.
PCT Application No. PCT/US2019/015124 International Preliminary Report on Patentability dated Sep. 1, 2020.
PCT Application No. PCT/US2019/015124 International Search Report and Written Opinion dated Apr. 15, 2019.
PCT Application No. PCT/US2019/015275 International Preliminary Report on Patentability dated Sep. 1, 2020.
PCT Application No. PCT/US2019/015275 International Search Report and Written Opinion dated Apr. 23, 2019.
PCT Application No. PCT/US2019/016167 International Preliminary Report on Patentability dated Sep. 1, 2020.
PCT Application No. PCT/US2019/016167 International Search Report and Written Opinion dated Aug. 26, 2019.
PCT Application No. PCT/US2019/016180 International Preliminary Report on Patentability dated Sep. 1, 2020.
PCT Application No. PCT/US2019/016180 International Search Report and Written Opinion dated Apr. 23, 2019.
PCT Application No. PCT/US2019/016686 International Preliminary Report on Patentability dated Sep. 1, 2020.
PCT Application No. PCT/US2019/016686 International Search Report and Written Opinion dated Apr. 10, 2019.
PCT Application No. PCT/US2019/016698 International Preliminary Report on Patentability dated Sep. 1, 2020.
PCT Application No. PCT/US2019/016698 International Search Report and Written Opinion dated Apr. 11, 2019.
PCT Application No. PCT/US2019/016694 International Preliminary Report on Patentability dated Sep. 1, 2020.
PCT Application No. PCT/US2019/016694 International Search Report and Written Opinion dated Apr. 15, 2019.
PCT Application No. PCT/US2019/017100 International Preliminary Report on Patentability dated Sep. 1, 2020.
PCT Application No. PCT/US2019/017100 International Search Report and Written Opinion dated Apr. 17, 2019.
U.S. Appl. No. 15/448,356 Final Office Action dated Oct. 21, 2020.
U.S. Appl. No. 15/448,356 Office Action dated May 28, 2020.
U.S. Appl. No. 15/448,356 Final Office Action dated Aug. 6, 2019.
U.S. Appl. No. 15/448,356 Office Action dated Jan. 8, 2019.
U.S. Appl. No. 15/448,356 Final Office Action dated Aug. 31, 2018.
U.S. Appl. No. 15/448,356 Office Action dated Mar. 5, 2018.
U.S. Appl. No. 15/450,602 Final Office Action dated Nov. 2, 2018.
U.S. Appl. No. 15/450,602 Office Action dated Apr. 6, 2018.
U.S. Appl. No. 16/681,477 Office Action dated Apr. 16, 2020.
U.S. Appl. No. 15/908,569 Office Action dated Mar. 27, 2020.
U.S. Appl. No. 15/908,569 Office Action dated Jun. 28, 2019.
U.S. Appl. No. 15/908,722 Office Action dated Oct. 30, 2020.
U.S. Appl. No. 15/908,722 Final Office Action dated Jun. 12, 2020.
U.S. Appl. No. 15/908,722 Office Action dated Jun. 28, 2019.
U.S. Appl. No. 15/908,635 Office Action dated Jun. 28, 2019.
U.S. Appl. No. 15/908,531 Office Action dated Jun. 28, 2019.
U.S. Appl. No. 15/908,657 Office Action dated Jun. 28, 2019.

(56) References Cited

OTHER PUBLICATIONS

U.S. Appl. No. 15/908,438 Office Action dated Oct. 3, 2019.
U.S. Appl. No. 15/908,345 Office Action dated Jan. 10, 2020.
U.S. Appl. No. 15/908,704 Final Office Action dated Jun. 12, 2020.
U.S. Appl. No. 15/908,704 Office Action dated Jun. 28, 2019.
U.S. Appl. No. 15/908,712 Office Action dated Aug. 8, 2019.
U.S. Appl. No. 15/908,707 Final Office Action dated Nov. 18, 2019.
U.S. Appl. No. 15/908,707 Office Action dated Jul. 17, 2019.
U.S. Appl. No. 17/207,679, filed Mar. 21, 2021, Christopher Thielbar, Online Tournament Integration.
U.S. Appl. No. 17/188,544, filed Mar. 1, 2021, Steven Trombetta, Scaled VR Engagement and Views in an E-Sports Event.
U.S. Appl. No. 17/380,373, filed Jul. 20, 2021, Steven Trombetta, Statistical Driven Tournaments.
Application No. 18763374.8, Extended European Search Report dated Dec. 14, 2020.
U.S. Appl. No. 16/681,477 Final Office Action dated Nov. 30, 2020.
Application No. 19761465.4 Extended European Search Report dated Sep. 1, 2021.
Application No. 19761341.7 Extended European Search Report dated Aug. 17, 2021.
Application No. 19761523.0 Extended European Search Report dated Aug. 12, 2021.
Application No. 202027037125 First Examination Report dated Aug. 5, 2021.
Application No. 19760493.7 Extended European Search Report dated Sep. 2, 2021.
U.S. Appl. No. 15/448,356 Office Action dated Apr. 12, 2021.
U.S. Appl. No. 16/681,477 Office Action dated Mar. 19, 2021.
U.S. Appl. No. 15/448,356 Final Office Action dated Jul. 28, 2021.
Application No. 19759929.3 Extended European Search Report dated Oct. 25, 2021.
Application No. 19760240.2 Extended European Search Report dated Feb. 2, 2022.
Application No. 202027037244 First Examination Report dated Dec. 15, 2021.
Dietrich et al., Carlos; "Baseball4D: A tool for baseball game reconstruction & visualization", 2014 IEEE Conference on Visual Analytics Science and Technology (VAST), IEEE, Oct. 25, 2014, pp. 23-32.
Application No. 19760732.8 Extended European Search Report dated Oct. 1, 2021.
Application No. 10-2019-7029332 Office Action dated Oct. 19, 2021.
Application No. 19760888.8 Extended European Search Report dated Oct. 27, 2021.
Application No. 19760016.6 Extended European Search Report dated Oct. 8, 2021.
Application No. 19760240.2 Partial Supplementary European Search Report dated Oct. 13, 2021.
Application No. 19760890.4 Extended European Search Report dated Nov. 10, 2021.
U.S. Appl. No. 17/014,149 Office Action dated Sep. 29, 2021.
U.S. Appl. No. 17/014,182 Office Action dated Sep. 29, 2021.
U.S. Appl. No. 17/000,841 Office Action dated Sep. 20, 2021.
U.S. Appl. No. 17/060,458 Office Action dated Oct. 6, 2021.
U.S. Appl. No. 17/080,551 Office Action dated May 12, 2022.
U.S. Appl. No. 17/188,544 Office Action dated Jun. 27, 2022.
U.S. Appl. No. 17/080,580 Office Action dated May 26, 2022.
U.S. Appl. No. 17/207,679 Office Action dated Jul. 22, 2022.

* cited by examiner

PLAYER TO SPECTATOR HANDOFF AND OTHER SPECTATOR CONTROLS

CROSS-REFERENCE TO RELATED APPLICATION

The present application is a continuation and claims the priority benefit of U.S. patent application Ser. No. 15/908,345 filed Feb. 28, 2018, which is incorporated herein by reference in its entirety

BACKGROUND OF THE INVENTION

Field of the Invention

Aspects of the subject technology relate to management of online gaming leagues, and in particular, to an online platform for automatically managing player rankings in a developer or player initiated online gaming competition.

Description of the Related Art

A video game is an electronic game in which a player interacts with a user interface coupled to a computing device, causing the computing device to generate visual feedback via a video device such as a television screen or computer monitor. The user interface for a video game may be, for example, an arcade joystick, a video game console controller, a computer keyboard, a computer mouse, a touchscreen display.

Some video games feature competitive or cooperative multi-player gameplay, meaning that multiple players play the same game simultaneously in a competitive or cooperative fashion, usually with each player having their own user interface. During "local" multiplayer, user interfaces for different players all connect to a single computing device. During local area network (LAN) multiplayer or online multiplayer, user interfaces for different players instead connect to different computing devices that then communicate with each other via a LAN or the internet.

In the same way that many sports fans enjoy watching sports games involving professional or amateur sports players both to learn sports techniques and to share a sense of community, many video game fans enjoy watching professional or amateur video game players both to learn video game techniques and to share a similar sense of community. Before the Internet, video game fans could watch a video game player play by being in the physical vicinity of the video game player and physically watching the video game player and the screen, such as at a friend's house, at an arcade, or at a video game competition.

More recently, some video games with network connectivity have been developed with an integrated "spectator" functionality in the game's code, allowing users with copies of the video game to watch live gameplay without actually playing or influencing the outcome of the game by receiving some of the same data from the game's servers that the players receive. Additionally, video streaming services such as Twitch® allow a video game player to record video content of themselves playing a video game that need not be developed with an integrated "spectator" functionality in the game's code, and to stream the video content live to spectators.

However, while a video game player at a traditional arcade might be able to physically step away from an arcade machine at which he/she is playing and hand the game controls off to his/her previously-spectating friend to take over control of gameplay mid-game, neither of these network-based video game spectating technologies offer any way to hand off control between a player and a spectator. Additionally, while sports players playing a game in a sports stadium might be encouraged or discouraged by cheers, chants, boos, or jeers of sports spectators sitting in the stadium in earshot of the players, network-based video game spectators are typically silent and invisible, both to each other and to video game players. Thus, neither players nor spectators of network-based video games feel the same kind of sense of community, common goal, or scale of fanbase that sports players and sports spectators in a crowded sports arena do. Furthermore, while fantasy leagues for a variety of sports are now widely available, comparable leagues for fans/spectators of network-based video games are not readily available.

DETAILED DESCRIPTION

In the same way that many sports fans enjoy watching sports games involving professional or amateur sports players both to learn sports techniques and to share a sense of community, many video game fans enjoy watching professional or amateur video game players both to learn video game techniques and to share a similar sense of community. Competitive gaming, sometimes referred to as electronic sports or "eSports," involves the play of video games in a competitive environment comparable to traditional sports.

During competitive gaming involving single-player games, players sometimes compete to achieve a high score, or to achieve a particular goal within the video game in a record time, sometimes referred to as a "speed run." During competitive gaming involving multi-player games, players sometimes likewise compete for best scores or times, but are also sometimes ranked against each other based on numbers of wins and/or losses against one another, or other statistics, often based on multiple game "matches" spread out over time, sometimes in a tournament style.

Competitive gaming includes localized video game competitions that take place in a particular physical location, in which case spectators may be in the physical vicinity of the players. Competitive gaming also includes virtual video game competitions with a more virtual organization structure conducted online or over local area networks (LAN), where gameplay footage may be distributed to spectators via a network connection broadly via video stream or more narrowly only to spectators with copies of the video game through a "spectator" functionality in the video game itself. Due to increasing popularity of the competitive gaming community, competition providers such as Major League Gaming (MLG) have more recently endeavored to provide an increased level of organization and structure to video game competitions for a number of video games, especially at the professional level.

The subject technology described herein enhances and expands the functionality of server(s) that provide gameplay information to video game spectators and of user devices corresponding to spectators. The servers may be associated with a video game, a video game platform/console, a video game league, or a combination thereof. The server(s) monitor timers and/or in-game events to identify that a trigger event has occurred, and in response, the server(s)

Figure 1:
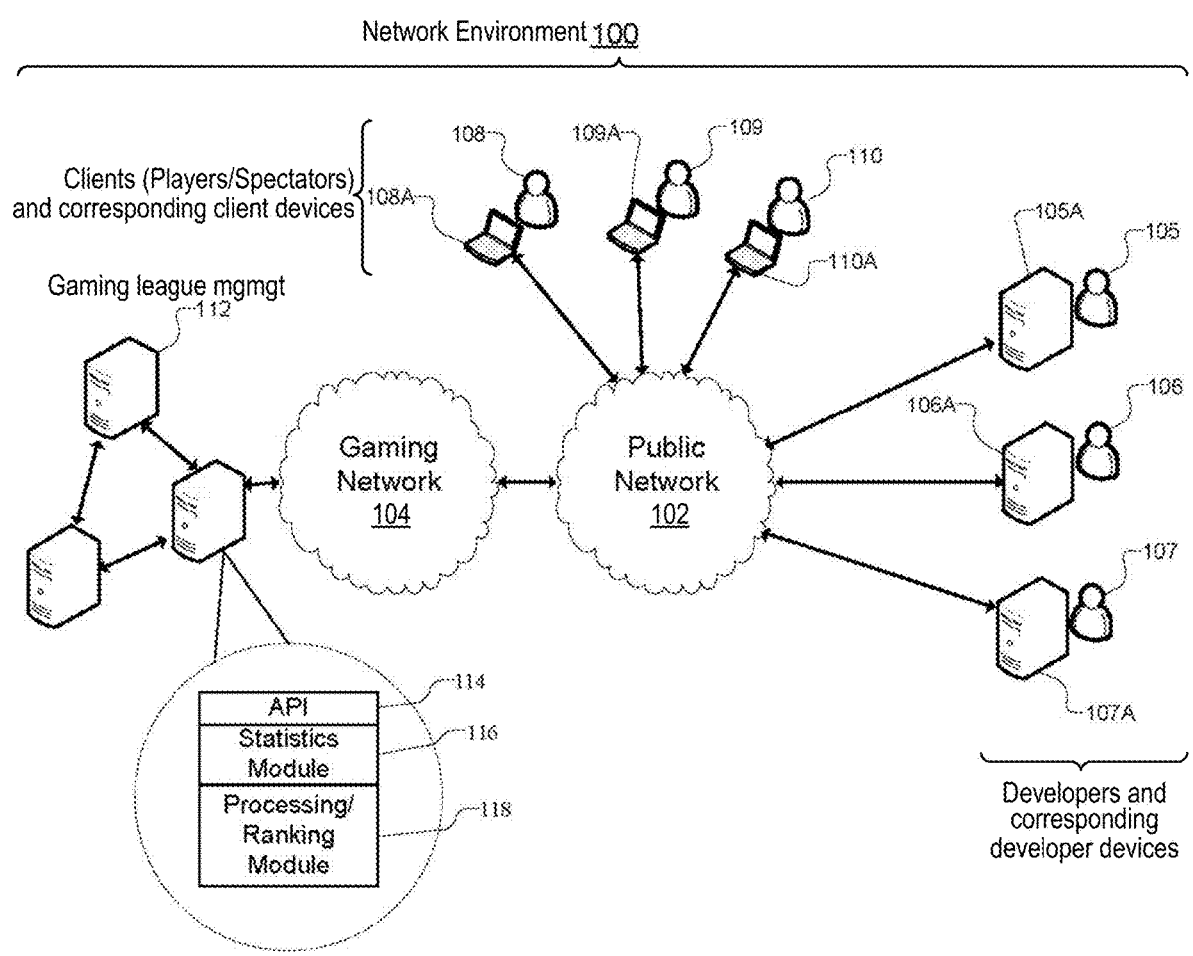
FIG. 1 illustrates an example of a network environment in which some aspects of the technology can be implemented.

FIG. 1 illustrates an example of network environment in which some aspects of the technology can be implemented.

Network environment 100 includes public network 102, which can include one or more private networks, such as a local area network (LAN), a wireless local area network (WLAN), a wide area network (WAN), or a network of public/private networks, such as the Internet. Public network 102 is communicatively coupled to gaming network 104, which may for example represent servers, routers, and other network hardware 220 supporting online gameplay for a particular type of client computing device, such as a particular brand of video game console. The gaming network 104 may be communicatively coupled to servers or may include servers and other network hardware/resources configured for implementing a gaming league management system 112. The gaming league management system 112 may also optionally operate on other gaming networks 104 for interoperability of gaming leagues between different gaming networks 104 and therefore different types of client computing devices 210. The gaming league management system 112 may include a number of servers and/or routers associated with operation and maintenance of network-based gameplay for particular video games, a particular video game platform/console, a video game league, or a combination thereof. The servers, routers, and other hardware used in gaming league management system 112, gaming network 104, and public network 102 may be computer systems 600 as illustrated in and discussed with respect to FIG. 6, or may include components of the computer systems 600.

Public network 102, and gaming network 104 provide client and developer access to league management system 112. As illustrated, clients 108, 109, and 110 are permitted access to league management system 112 using respective client devices (e.g., 108A, 109A, and 110A). Clients, and their respective devices, may take on a player role or a spectator role at any given time in a given video game match. Although client devices 108A, 109A, and 110A, are depicted as personal computing devices, it is understood that the client devices can include various types of processor-based systems, including but not limited to: game consoles, smart phones, tablet computer systems, and the like. Example of hardware systems that can be used to implement the client device are illustrated in and discussed in further detail below with respect to FIG. 2 and FIG. 6. Similarly, developers (e.g., 105, 106 and 107), are permitted access to league management system via respective their computing systems (e.g., 105A, 106A, and 107A). Developer computing systems may likewise be computer systems 600 as illustrated in and discussed with respect to FIG. 6, or may include components of the computer systems 600.

It is understood that a greater or smaller number of clients and/or developers can be engaged with environment 100 than are illustrated in FIG. 1 and described herein, without departing from the scope of the technology.

Some video games, especially those with online multi-player capabilities, allow spectators to watch gameplay without actually playing or influencing the outcome of the game in any way. The spectator functionality is typically developed by developers (e.g., 105, 106 and 107) with an integrated "spectator" functionality. The integrated "spectator" functionality may be integrated into code of the particular video game that runs during gameplay and/or into online servers that help operate the particular video game's online multiplayer functionality. A spectator client using such an integrated spectator function generally has a copy of the video game whose gameplay he/she is spectating on his/her corresponding client device, allowing the spectator client device to render the gameplay in the same way or in a similar way that client computing devices of player clients render the gameplay, only without giving the spectator client any opportunity to control the gameplay via the spectator's client computing device.

This type of game-integrated spectating technology has the benefit of being more efficient in terms of network bandwidth usage than spectating via streaming of video content, as online games are typically optimized to use as little bandwidth as possible to maintain an acceptable gameplay speed for all players and spectators. The online games accomplish this by transmitting instructions as to how to render a shared virtual space, and then how to render modifications/updates to that shared virtual space over the course of gameplay over a time period between a beginning and an end of a game match. While the initial rendering of the shared virtual space may be complex—for instance, the game and/or game's servers may instruct player and spectator client devices to render numerous character avatars, pieces of scenery, landscapes, buildings, and so forth—later updates/modifications to the shared virtual space are generally less complex. For instance, for an update/modification during gameplay in the example of the preceding sentence, the game and/or game's servers may instruct player and spectator client devices to render that one of the character avatars has moved forward slightly while everything else previously rendered has remained static.

An alternate technical methodology whereby spectating can occur is via online video streaming. This can allow spectators to "live-stream" video content of a particular player playing a particular video game, either in real-time or with a slight delay. This video streaming approach to video game spectating has both benefits and downsides compared to game-integrated spectating functions. In reference to FIG. 1, the gameplay is recorded at player client devices (108A/109A/110A) and sent to spectator client devices (108A/109A/110A), optionally via networks 102/104/112 or similar video-streaming-focused networks not illustrated in FIG. 1.

One benefit to the video streaming approach to video game spectating over game-integrated spectating is that video games that do not have any sort of "spectator" functionality integrated into the game during development can still be spectated, for instance allowing spectators to watch a player play an older game, an emulated game, or a game that otherwise has no online connectivity. Thus, video streaming essentially extends the functionality of the video game beyond its original capabilities. Another benefit is that a wide variety of computing devices can be used to spectate, regardless of processing capability or compatibility with the game being watched. That is, a spectator can spectate a player playing a graphically intensive game from their phone or another device that would not have the processing capabilities to render the gameplay of the graphically intensive game, and/or that is running an operating system that is not compatible with the graphically intensive game.

One downside of the video streaming approach, however, is that it typically uses more network bandwidth than hardcoded "spectator" features as discussed above during gameplay. For instance, even if little or nothing is changing in the shared virtual space of the game—as when few or none of the players have input any control inputs to move an avatar or cause some other modification to the shared virtual space—video must still be recorded at a player client device and sent to spectator client devices, optionally via networks 102/104/112 or similar video networks. This is also more demanding on the player client device, and any servers/network hardware in between the player client devices and the spectator client devices.

Integrated spectating technology can overcome most of its downsides while retaining its benefits by being coded into a particular type of client device (such as a particular brand of video game console/platform), the gaming network 104, and/or a video gaming league management platform 112 in addition to or instead of into a video game itself. That is, client computing devices 108A/109A/110A of a particular type—such as video game consoles of a particular brand—may include this integrated spectating technology, as well as the gaming network 104 associated with client computing devices 210 of that particular type. Alternately or additionally, client computing devices 210 that are optionally of different types may all be compatible with a video gaming league management platform 112 that includes servers 112 and/or software running on the client computing devices 210.

The particular type of client device (such as a particular brand of video game console/platform), the gaming network 104, and/or a video gaming league management platform 112 may include application programming interfaces (APIs) associated with spectating video games. In FIG. 1, for instance, the video gaming league management platform 112 is illustrated as having an API 114, though the APIs discussed herein may alternately or additionally be implemented in the gaming network 104 and/or the client computing devices 210. An individual video game and/or servers associated with the individual video game can then call spectator functions coded into such an API during gameplay to invoke spectator functionality. The spectator function may be standardized across that type of client device 210, that gaming network 104, and/or that video gaming league platform 112. In this way, a spectator client device no longer needs to possess or run a copy of a particular video game to spectate gameplay of the video game—instead, the spectator client device simply needs to be of a particular type, to have access to the gaming network 104, to have access to the gaming league platform 112, or a combination thereof. This provides the benefit of eliminating one of the major downsides of game-integrated spectating technologies—that is, eliminating the requirement that spectators own a video game despite only wanting to spectate rather than play.

Additionally, integrated spectating technology into gaming networks 104 or video gaming league platforms 112 can in some cases allow spectators to spectate games that might not otherwise run on their respective spectator client device. Because the video game data is in a standardized format using the API 114 or a gaming network 104 API, as long as the spectator client device can operate with the video gaming league platform 112 or gaming network 104, it can spectate the game. For example, a client computing device running an operating system that is incompatible with a particular video game but that is compatible with the video gaming league platform 112 or gaming network 104 may still be able to spectate a game match of that otherwise incompatible video game.

Game-integrated, console/platform-integrated, network-integrated, and/or league-integrated spectating technologies may provide extended levels of control for spectators because information about the entire shared virtual space is sent to the spectator, not just what a particular player sees, before the game content is rendered at the spectator's computing device. The spectator can be given an increased control over their view of the gameplay, allowing the spectator to pan, zoom, or rotate their perspective. A spectator may also emulate different viewing perspectives of different players currently playing the game, in series or in parallel. In this way, in a game with multiple players in the same shared virtual environment, a spectator may be able to view more than any individual player can, for example by repeatedly changing their view of the shared virtual space. Spectators can also hand over partial or total control of their views to a "view curator" as discussed further with respect to FIG. 5.

Game-integrated, console/platform-integrated, network-integrate, and/or league-integrated spectating technologies also allow additional ways for players and spectators to interact with the shared virtual environment and with each other. For example, integrated spectating technologies allow two client devices to swap player/spectator roles as illustrated in and discussed with respect to FIG. 3. In some games, spectators may form a virtual audience that may be visible and/or audible within the game by players and/or by other spectators, for example causing the game to generate different levels of cheering, chanting, booing, or jeering based on positive or negative inputs from spectators, the positive or negative inputs optionally concerning a particular human player, a particular computer-controlled simulated player, or a particular team of players, as illustrated in and discussed with respect to FIG. 4A and FIG. 4B.

Some games may generate a spectator-controllable avatar that a spectator that can move throughout the shared virtual environment of the game during gameplay responsive to inputs to the gaming network 104 and/or league platform 112 from spectator client devices 210, where the spectator-controllable avatar has limited or no ability to interact with players in a manner that impacts the outcome of the game. Such a spectator avatar might be visible to players or might only be visible to other spectators. In some games, spectators might be able to alter the shared game environment in ways that affect gameplay for players, for instance by changing colors of certain areas or by setting traps that can hinder players.

Figure 2:
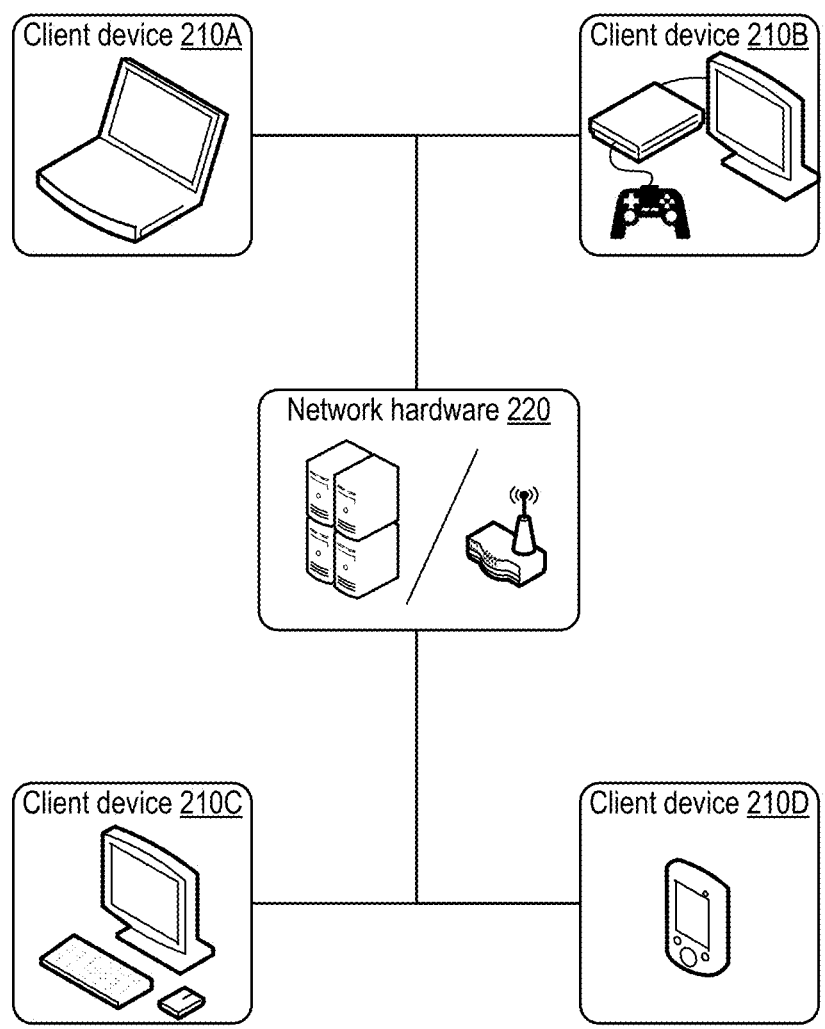
FIG. 2 illustrates a network-based video game environment involving different types of client computing devices.

FIG. 2 illustrates a network-based video game environment involving different types of client computing devices.

Figure 6:
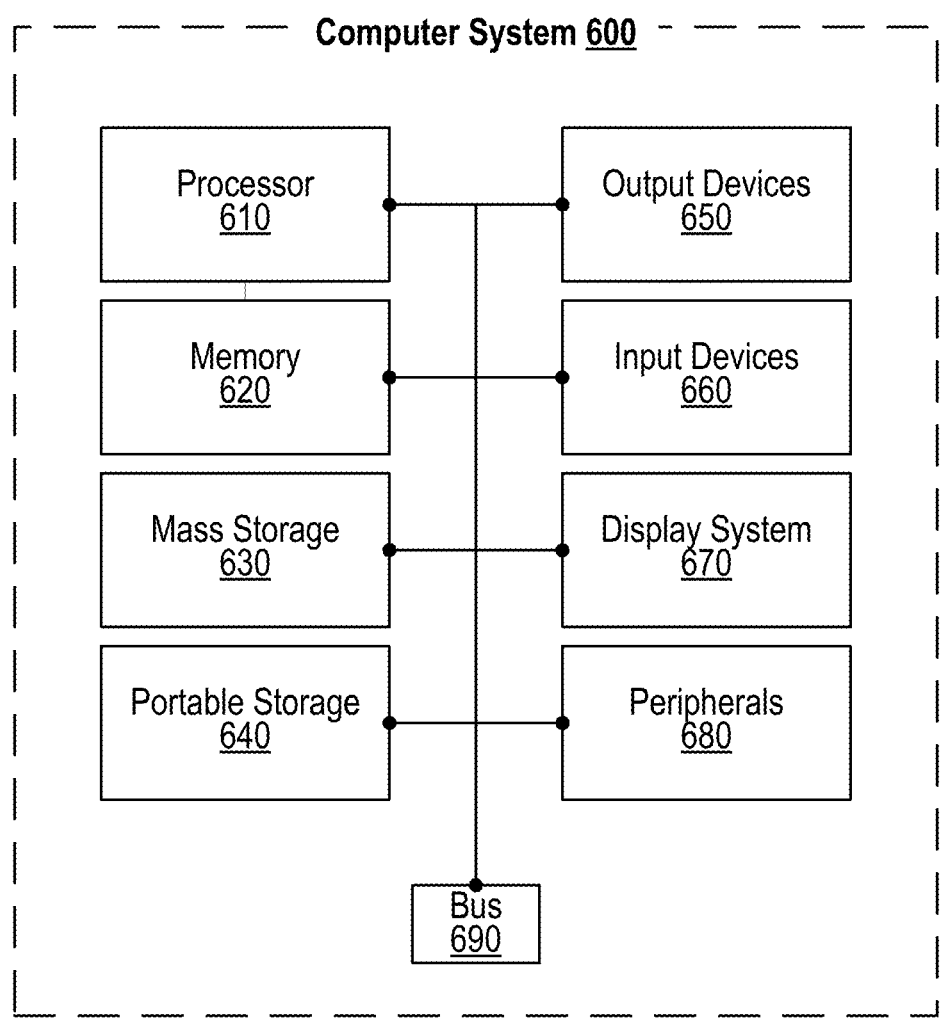
FIG. 6 is a block diagram of an exemplary computing device that may be used to implement some aspects of the subject technology.

The network environment 100 of FIG. 1 may be implemented using different types of client computing devices 210, each of which represent computer systems 600 or at least include components as being part of the computer system 600 of FIG. 6.

For instance, FIG. 2 illustrates a first client computing device 210A that is a laptop portable computer, a second client computing device 210B that is a home video game console connected to a television, a third client computing device 210C that is a desktop home computer, and a fourth client computing device 210D that is a smartphone/tablet portable computing device and/or a portable video game console. Any of the client computing devices 210 of FIG. 2 may be assigned player roles or spectator roles for a particular game. In the context of the environment 100 of FIG. 1, each of the client computing devices 108A, 109A, and 110A of FIG. 1 are client computing devices 210.

All four of the client computing devices 210 of FIG. 2 are communicatively coupled together via network hardware 220, which in the context of the environment 100 of FIG. 1, may include various servers, routers, and other network hardware within one or more gaming league management platform system(s) 112, one or more gaming network(s) 104, the public network 102, or a combination thereof.

Figure 3:
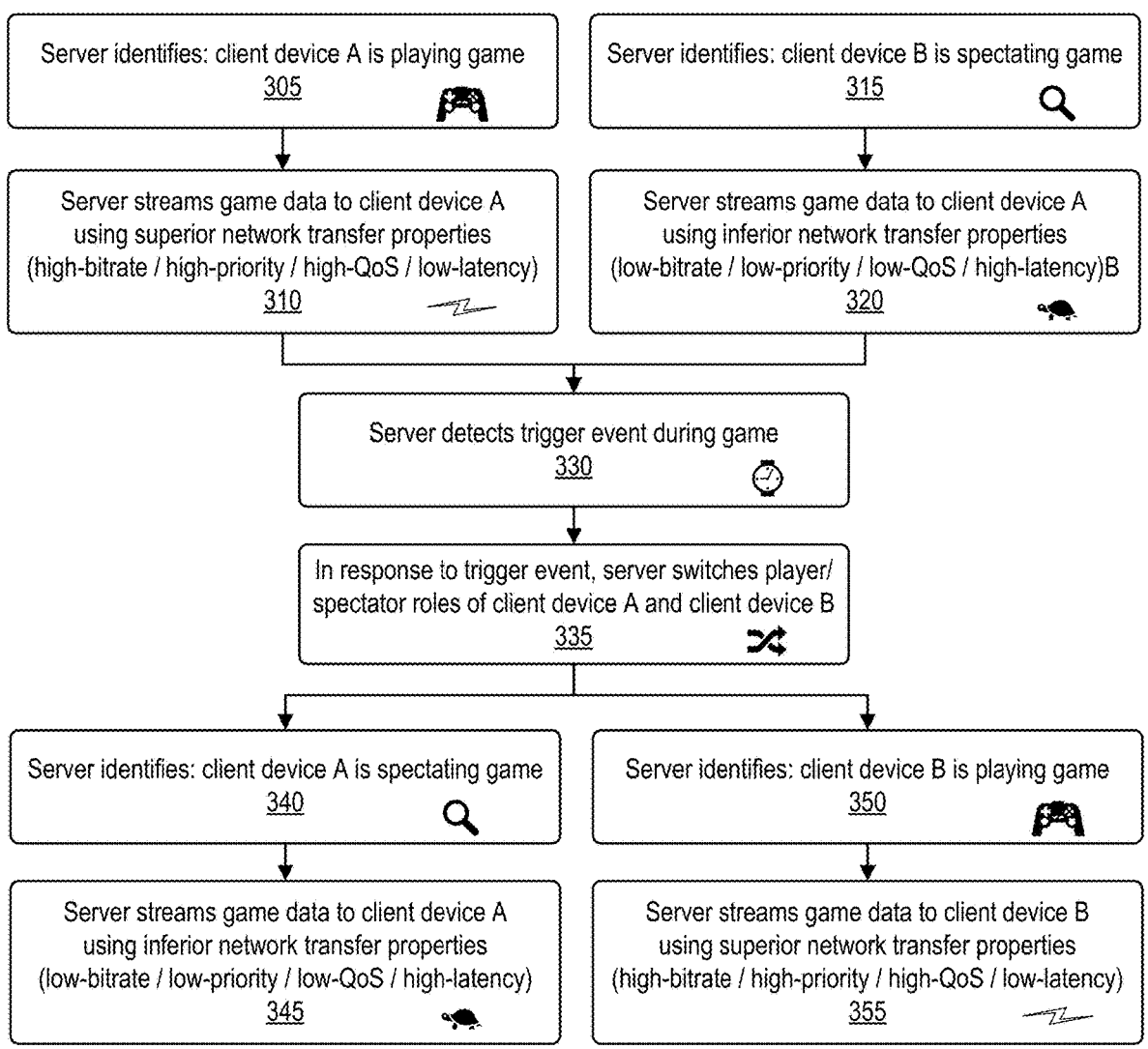
FIG. 3 is a flow diagram illustrating server network operations for automatically switching player and spectator roles in response to a trigger event.

FIG. 3 is a flow diagram illustrating server network operations for automatically switching player and spectator roles in response to a trigger event.

At step 305, a game server identifies that a first client computing device A is currently assigned a player role within a video game.

At step 310, the game server delivers video game data—that is, data corresponding to at least a shared virtual environment in which gameplay takes place during a time period between a beginning of a game match of the video and an end of the game match of the video game—to the first client computing device A. Because the first client computing device A is currently assigned a player role within the video game, the game server delivers the video game data stream to the first client computing device A using one or more superior network transfer properties. That is, the game server delivers the video game data stream to the first client computing device A at a high bitrate, a high priority, a high Quality of Service (QoS), a low latency, or a combination thereof. This ensures that as a player in the video game, the gameplay experience for the first client computing device A is smooth.

At step 315, a game server identifies that a second client computing device B is currently assigned a spectator role within the video game.

At step 320, the game server delivers the video game data to the second client computing device B. Because the second client computing device B is currently assigned a spectator role within the video game, the game server delivers the video game data stream to the second client computing device B using one or more inferior network transfer properties. That is, the game server delivers the video game data stream to the second client computing device B at a low bitrate, a low priority, a low quality-of-service (QoS), a high latency, or a combination thereof. Unlike players, spectators provide little or no influence on an outcome of the game match, and therefore the video game data received by the spectator can be more choppy, less smooth, or less detailed if necessary to improve the experience for players and to therefore provide optimal gameplay.

At step 330, the game server detects a trigger event during the game match of the game. The trigger event may be time-based. For example, the trigger event may hand off control from the current player to a current spectator after a predetermined duration of time has elapsed, such as a predetermined number of minutes. The game server may detect based on gameplay whether or not the switching would occur at a time when it is "safe" to switch. For example, when an avatar controlled by the current player is in imminent danger, the game server may add on additional time until the avatar controlled by the current player is no longer in danger before detecting the trigger event to cause the switch in step 335.

The trigger event of step 330 may alternately/additionally be based on input from the current player, for example where the current player presses a button to indicate that they no longer wish to play either permanently (as when the player is going to sleep) or temporarily (as when the player wants to use the restroom). In this way, gameplay is not affected despite the current player being "away from keyboard" or otherwise away from their controls.

The trigger event of step 330 may alternately/additionally be based on inputs from spectators. For example, if enough spectators vote that a particular player is cheating, playing unfairly, or doing a bad job, the spectators can vote to have that player replaced, where a number of such votes from spectators surpassing a predetermined threshold number or percentage (of the total number of spectators) can be detected by the game server as a trigger event.

At step 335, the game server switches the player/spectator roles of the first client computing device A and the second client computing device B in response to detecting the trigger event in step 330. That is, the role of the first client computing device A is switched from a player role to a spectator role, and the role of the second client computing device B is switched from a spectator role to a player role.

At step 340, a game server identifies that a first client computing device A is currently assigned a spectator role within the video game.

At step 345, the game server delivers the video game data to the first client computing device A. Because the first client computing device A is currently assigned a spectator role within the video game, the game server delivers the video game data stream to the first client computing device A using one or more inferior network transfer properties. That is, the game server delivers the video game data stream to the first client computing device A at a low bitrate, a low priority, a low Quality of Service (QoS), a high latency, or a combination thereof. The inferior network transfer properties used by the game server to deliver the video game data to the first client computing device A in step 345 are inferior to the superior network transfer properties used by the game server to deliver the video game data to the first client computing device A of step 310.

At step 350, a game server identifies that a second client computing device B is currently assigned a spectator role within the video game.

At step 355, the game server delivers the video game data to the second client computing device B. Because the second client computing device B is currently assigned a player role within the video game, the game server delivers the video game data stream to the second client computing device B using one or more superior network transfer properties. That is, the game server delivers the video game data stream to the second client computing device B at a high bitrate, a high priority, a high Quality of Service (QoS), a low latency, or a combination thereof. The superior network transfer properties used by the game server to deliver the video game data to the second client computing device B in step 355 are superior to the inferior network transfer properties used by the game server to deliver the video game data to the first client computing device A of step 320.

The game server downgrades one or more network transfer properties in its transfer of video game data to the first client device A between step 310 and step 345. That is, the bitrate decreases, the priority decreases, the QoS decreases, the latency increases, or a combination thereof. Some of these measurements fluctuate during network use, so this downgrade may represent a downgrade in terms of ranges or averages. In other words, one or both endpoints of a range of acceptable bitrates/priorities/QoS may decrease, and/or one or both endpoints of a range of acceptable latencies may increase. Likewise, an average bitrates/priority/QoS may decrease, and/or an average latency may increase.

The game server downgrades one or more network transfer properties in its transfer of video game data to the second client device B between step 320 and step 355. That is, the bitrate increases, the priority increases, the QoS increases, the latency decreases, or a combination thereof. Some of these measurements fluctuate during network use, so this upgrade may represent an upgrade in terms of ranges or averages. In other words, one or both endpoints of a range of acceptable bitrates/priorities/QoS may increase, and/or one or both endpoints of a range of acceptable latencies may decrease. Likewise, an average bitrates/priority/QoS may increase, and/or an average latency may decrease.

While the same terms are used on FIG. 4 to describe network transfer properties in step 310 and step 355, and to describe network transfer properties in step 320 and step 345, it should be understood that these optionally can, but do not necessarily, represent the same network transfer properties. That is, the superior network transfer properties of step 310 need not be the same as the superior network transfer properties of step 355 (but optionally can be), and the inferior network transfer properties of step 320 need not be the same as the inferior network transfer properties of step 345 (but optionally can be). These pairs of steps concern different client devices that may have different inherent processing and network capabilities, and may have different connection types/qualities that may impact bitrates, priority, QoS, or latency in ways that the game server cannot control. Similarly, and for the same reasons, the superior network transfer properties of step 310 need not be superior to the inferior network transfer properties of step 320 (but optionally can be), and the superior network transfer properties of step 355 need not be superior to the inferior network transfer properties of step 345 (but optionally can be).

Figure 4A:
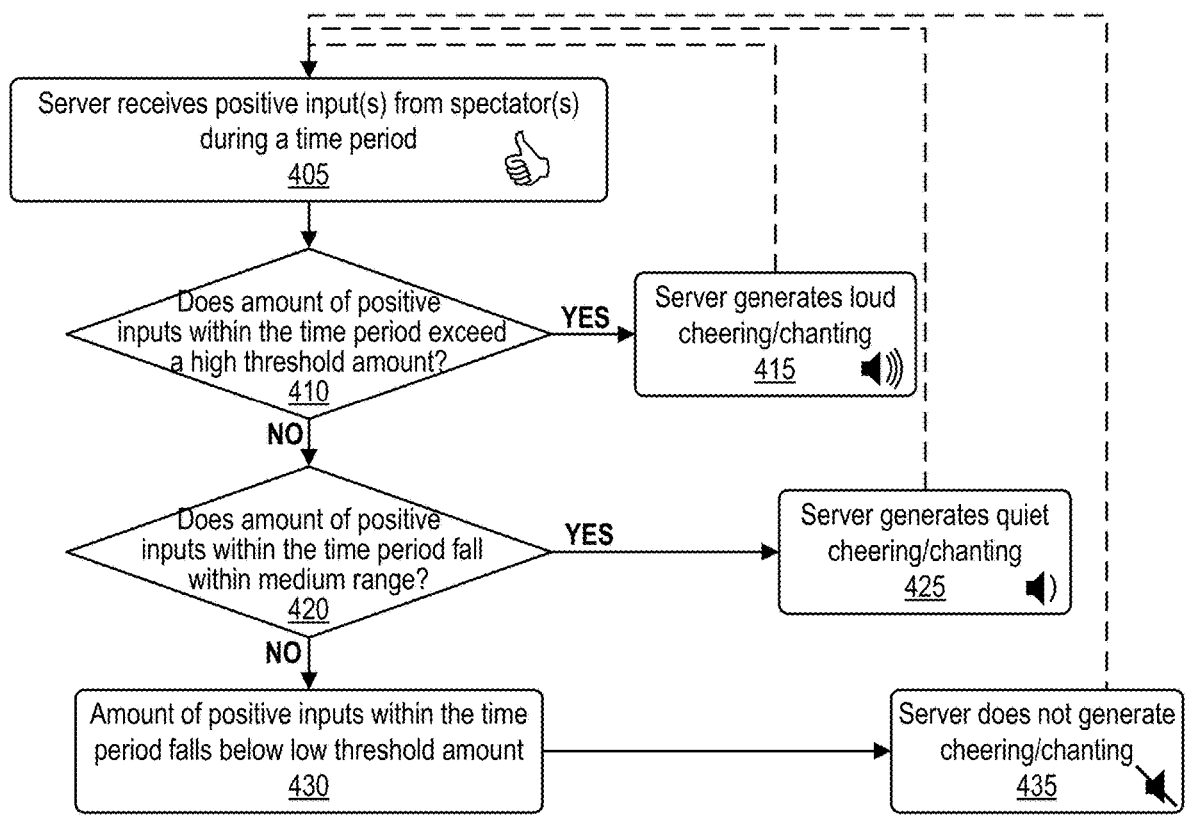
FIG. 4A is a flow diagram illustrating server network operations for automatically generating cheering or chanting during gameplay based on inputs from game spectators.

FIG. 4A is a flow diagram illustrating server network operations for automatically generating cheering or chanting during gameplay based on inputs from game spectators.

At step 405, a game server receives one or more positive inputs from one or more spectator client devices 210 during a particular time period. The time period may be a duration of a game match. Alternately, receipt of a first positive input can begin a countdown of the time period, and then a number of positive inputs is counted while the timer counts down to the end of the time period. Alternately, the time period may be flexible—for instance, every time a positive input is received, the time period may be extended by a predetermined additional time period. The time period of step 405 of FIG. 4A may, but need not, be the same as the time period of step 445 of FIG. 4B.

The positive input may be represented, for example, by a thumbs-up symbol, a smiley face, or a positive or encouraging word/phrase. An amount of positive inputs received during the time period is counted by the game server either in real-time or at the end of the time period, where the amount of positive inputs is either a number of positive inputs received during the time period or a percentage of the number of spectators that have sent a positive input.

At step 410, the amount of positive inputs received by the game server from the one or more spectator devices is compared to a high threshold amount. The predetermined high threshold amount may be a threshold number representing a particular number of positive inputs received. The predetermined high threshold amount may be a threshold percentage representing a particular percentage of the number of spectators.

If the amount of positive inputs retrieved in step 405 is above the predetermined high threshold amount, the game server generates loud cheering or chanting at step 415 for a predetermined cheering/chanting time period, after which the process may begin again at step 405.

At step 420, the amount of positive inputs received by the game server from the one or more spectator devices is compared to a medium range, for example between the predetermined high threshold amount of step 410 and a predetermined low threshold amount also referenced in step 430. The predetermined low threshold amount may be a threshold number representing a particular number of positive inputs received. The predetermined low threshold amount may be a threshold percentage representing a particular percentage of the number of spectators. In either case, the predetermined low threshold amount is lower than the predetermined high threshold amount.

If the amount of positive inputs retrieved in step 405 is within the medium range, the game server generates quiet cheering or chanting at step 425 for a predetermined cheering/chanting time period, after which the process may begin again at step 405.

At step 430, the amount of positive inputs received by the game server from the one or more spectator devices must be lower than the predetermined low threshold amount discussed with respect to step 420. Accordingly, at step 435, the game server generates no (or very quiet) cheering or chanting at step 435, after which the process may begin again at step 405.

Figure 4B:
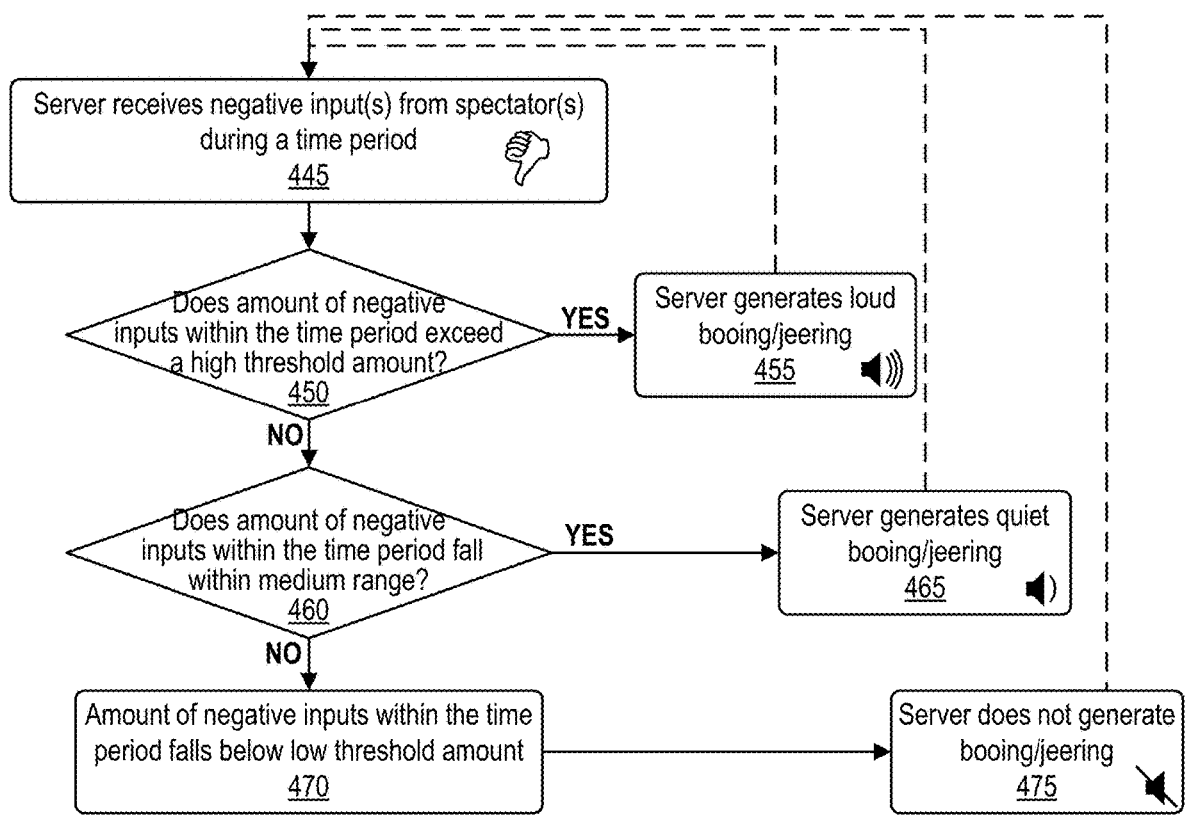
FIG. 4B is a flow diagram illustrating server network operations for automatically generating booing or jeering during gameplay based on inputs from game spectators.

FIG. 4B is a flow diagram illustrating server network operations for automatically generating booing or jeering during gameplay based on inputs from game spectators.

At step 445, a game server receives one or more negative inputs from one or more spectator client devices 210 during a particular time period. The time period may be any of the possible time period types discussed with respect to step 405 of FIG. 4A. The time period of step 445 of FIG. 4A may, but need not, be the same as the time period of step 445 of FIG. 4B.

The negative input may be represented, for example, by a thumbs-down symbol, a frowning face, or a negative or discouraging word/phrase. An amount of negative inputs received during the time period is counted by the game server either in real-time or at the end of the time period, where the amount of negative inputs is either a number of negative inputs received during the time period or a percentage of the number of spectators that have sent a negative input.

At step 450, the amount of negative inputs received by the game server from the one or more spectator devices is compared to a high threshold amount. The predetermined high threshold amount may be a threshold number representing a particular number of negative inputs received. The predetermined high threshold amount may be a threshold percentage representing a particular percentage of the number of spectators.

If the amount of negative inputs retrieved in step 445 is above the predetermined high threshold amount, the game server generates loud booing/jeering at step 455 for a predetermined booing/jeering time period, after which the process may begin again at step 445.

At step 460, the amount of negative inputs received by the game server from the one or more spectator devices is compared to a medium range, for example between the predetermined high threshold amount of step 450 and a predetermined low threshold amount also referenced in step 470. The predetermined low threshold amount may be a threshold number representing a particular number of negative inputs received. The predetermined low threshold amount may be a threshold percentage representing a particular percentage of the number of spectators. In either case, the predetermined low threshold amount is lower than the predetermined high threshold amount.

If the amount of negative inputs retrieved in step 445 is within the medium range, the game server generates quiet booing/jeering at step 465 for a predetermined booing/jeering time period, after which the process may begin again at step 445.

At step 470, the amount of negative inputs received by the game server from the one or more spectator devices must be lower than the predetermined low threshold amount discussed with respect to step 460. Accordingly, at step 475, the game server generates no (or very quiet) booing/jeering at step 475, after which the process may begin again at step 445.

The mechanisms for the game server generating cheering, chanting, booing, and jeering based on spectator input illustrated in and discussed with respect to FIG. 4A and FIG. 4B may be include more or fewer ranges or volume levels than illustrated and described herein. That is, the medium range of step 410 or step 460 may be subdivided further or eliminated altogether.

The mechanisms for the game server generating cheering, chanting, booing, and jeering based on spectator input illustrated in and discussed with respect to FIG. 4A and FIG. 4B may affect each other, and may operate in net or based on averages. For example, negative inputs may represent a negative number while negative inputs represent a negative number, and a negative input may therefore cancel out a negative input. This may be useful when it is desirable to only have cheering/chanting or booing/jeering, but not both, to avoid noise confusion.

The mechanisms for the game server generating cheering, chanting, booing, and jeering based on spectator input illustrated in and discussed with respect to FIG. 4A and FIG. 4B may be segmented by player or by team. That is, spectators can provide on average negative inputs corresponding to a blue team or player, and on average negative inputs corresponding to a red team or player, resulting in cheers/chants that support the blue player or team and boos/jeers that denigrate the red player or team.

The mechanisms for the game server generating cheering, chanting, booing, and jeering based on spectator input illustrated in and discussed with respect to FIG. 4A and FIG. 4B may be visual instead of or in addition to auditory. For instance, loud cheers/chants may correspond to an in-game representation of a large crowd or a large portion of a crowd visually cheering/chanting, quiet cheers/chants may correspond to an in-game representation of a small crowd or a small portion of a crowd visually cheering/chanting, and no cheers/chants may correspond to no in-game representation of any crowd or no portion of a crowd visually cheering/chanting. Likewise instance, loud boos/jeers may correspond to an in-game representation of a large crowd or a large portion of a crowd visually booing/jeering, quiet boos/jeers may correspond to an in-game representation of a small crowd or a small portion of a crowd visually booing/jeering, and no boos/jeers may correspond to no in-game representation of any crowd or no portion of a crowd visually booing/jeering. The volume of cheers/chants or boos/jeers may correspond to different colors along a color spectrum that appear in-game, or intensity/brightness of colors. For example, loud cheering/chanting can be represented by blue or green, while loud booing or jeering can be represented by red.

Where the mechanisms for the game server generating cheering, chanting, booing, and jeering based on spectator input illustrated in and discussed with respect to FIG. 4A and FIG. 4B are segmented by player or by team, cheering/chanting for a particular player or team or may be represented by a color or symbol associated with that player or team. Likewise, booing/jeering for a particular player or team or may be represented by a color or symbol associated with that player or team. For example, if spectators provide on average negative inputs corresponding to a blue team or player, and on average negative inputs corresponding to a red team or player, a crowd can generated in-game with signs saying "Go Blue!" and "Boo Red!" or similar statements.

The mechanisms for the game server generating cheering, chanting, booing, and jeering based on spectator input illustrated in and discussed with respect to FIG. 4A and FIG. 4B may be simplified to simply count spectators spectating as a positive input or a negative input. That is, cheering/chanting or booing/jeering may occur simply based on a number of spectators viewing the game during the time period without the spectators having to provide inputs either way. Spectators can pre-select allegiances to particular players or teams if they want to any cheering/chanting or booing/jeering caused by their presence (or inputs) to support or denigrate any particular player(s) or team(s)

Figure 5:
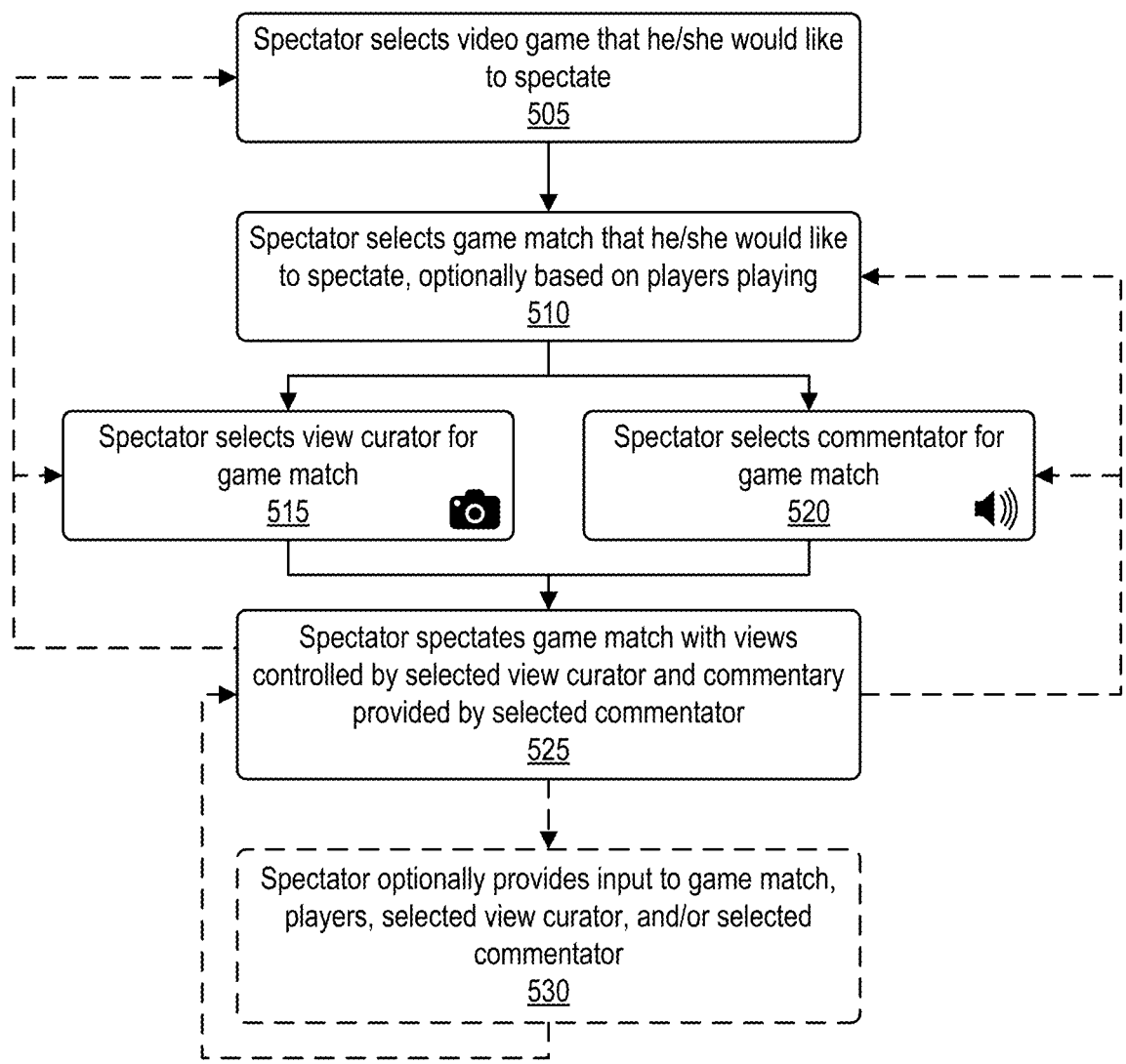
FIG. 5 is a flow diagram illustrating spectator operations for customized spectating experience.

FIG. 5 is a flow diagram illustrating spectator operations for customized spectating experience.

At step 505, a spectator selects a video game that he/she would like to spectate. The spectator's client device 210 sends this selection to the game server.

At step 510, the spectator selects a game match of the video game selected in step 505 that the spectator would like to spectate. For example, the spectator may choose a particular game match based on the fact that a particular player or team is playing in that game match. The spectator's client device 210 sends this selection to the game server.

At step 515, the spectator selects a game view curator for the game match selected in step 510. The game view curator may dictate what the spectator sees, essentially acting as a director or cinematographer for the game match footage. The game view curator may be the spectator himself/herself, another spectator, a player in the game, or an artificially intelligent system. The game view curator may control the viewing angle, the zoom, the rotation, the speed (e.g., slow-motion, fast-forward), may rewind or recall replay footage, and other view controls. The spectator's client device 210 sends this selection to the game server.

At step 520, the spectator selects a game commentator for the game match selected in step 510. The game commentator provides audio-based and/or text-based and/or video-based commentary during gameplay. The game commentator may be the spectator himself/herself, another spectator, a player in the game, or an artificially intelligent system. The spectator's client device 210 sends this selection to the game server.

At step 525, the spectator spectates the game match selected at step 510 of the video game selected at step 505, with the views displayed by the spectator's client device 210 controlled by the view curator selected at step 515, and with audio/textual/video commentary provided to the spectator's client device 210 by the game commentator selected at step 520. The spectator may go back to any of steps 505, 510, 515, or 520 to change the game being spectated, the game match being spectated, the view curator, or the game commentator.

At optional step 530, the spectator optionally provides input to the game match, players, selected view curator, and/or selected commentator. This input may be in the form of audio/textual/video commentary or positive/negative spectator inputs similar to those illustrated in and described with respect to FIG. 4A and FIG. 4B.

While some of the operations illustrated in and discussed with respect to the flow diagrams of FIG. 3, FIG. 4A, FIG. 4B, and FIG. 5 are identified herein as performed by a "game server," it should be understood that they can be performed by one or more client computing device(s), one or more game server(s), any other computer system(s) 600 discussed herein, or a combination thereof. It should also be understood that the term "game server" used with respect to these figures refers to any server or network hardware 220 within the gaming league management platform system 112, the gaming network 104, the public network 102, or a combination thereof.

FIG. 6 illustrates an exemplary computing system 600 that may be used to implement some aspects of the subject technology. For example, any of the computing devices, computing systems, network devices, network systems, servers, and/or arrangements of circuitry described herein may include at least one computing system 600, or may include at least one component of the computer system 600 identified in FIG. 6. The computing system 600 of FIG. 6 includes one or more processors 610 and memory 620. Each of the processor(s) 610 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 610 may include one or more cores, either integrated onto a single chip or spread across multiple chips connected or coupled together. Memory 620 stores, in part, instructions and data for execution by processor 610. Memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive or any other type of memory/storage discussed below, is a non-volatile storage device for storing data and instructions for use by processor unit 610. Mass storage device 630 can store the system software for implementing some aspects of the subject technology for purposes of loading that software into memory 620.

Portable storage device 640 operates in conjunction with a portable non-volatile storage medium, such as a floppy disk, compact disk (CD), digital video disc (DVD), or any other type of memory/storage discussed below, to input and output data and code to and from the computer system 600 of FIG. 6. The system software for implementing aspects of the subject technology may be stored on such a portable medium and input to the computer system 600 via the portable storage device 640.

The memory 620, mass storage device 630, or portable storage 640 may in some cases store sensitive information, such as transaction information, health information, or cryptographic keys, and may in some cases encrypt or decrypt such information with the aid of the processor 610. The memory 620, mass storage device 630, or portable storage 640 may in some cases store, at least in part, instructions, executable code, or other data for execution or processing by the processor 610.

Output devices 650 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 670. The printer may be inkjet, laserjet, thermal, or some combination thereof. In some cases, the output device circuitry 650 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 650 may include any ports, plugs, antennae, or any other components necessary for the communication types listed above, such as cellular Subscriber Identity Module (SIM) cards.

Input devices 660 may include circuitry providing a portion of a user interface. Input devices 660 may include an alpha-numeric keypad, such as a keyboard, for inputting alpha-numeric and other information, or a pointing device, such as a mouse, a trackball, stylus, or cursor direction keys. Input devices 660 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 660 may include any ports, plugs, antennae, or any other components necessary for the communication types listed above, such as cellular SIM cards.

Display system 670 may include a liquid crystal display (LCD), a plasma display, an organic light-emitting diode (OLED) display, an electronic ink or "e-paper" display, a projector-based display, a holographic display, or another suitable display device. Display system 670 receives textual and graphical information, and processes the information for output to the display device. The display system 670 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 680 may include any type of computer support device to add additional functionality to the computer system. For example, peripheral device(s) 680 may include a modem, a router, an antenna, a printer, a bar code scanner, a quick-response ("QR") code scanner, a document/image scanner, a visible light camera, a thermal/infrared camera, an ultraviolet-sensitive camera, a night vision camera, a light sensor, a battery, a power source, or some combination thereof.

The components contained in the computer system 600 of FIG. 6 are those typically found in computer systems that may be suitable for use with some aspects of the subject technology and are intended to represent a broad category of such computer components that are well known in the art. Thus, the computer system 600 of FIG. 6 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 600 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 600 may be part of a multi-computer system that uses multiple computer systems 600, each for one or more specific tasks or purposes. For example, the multi-computer system may include multiple computer systems 600 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 600 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 620, the mass storage 630, the portable storage 640, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay®/Mastercard®/Visa® (EMV) chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L6), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 610 for execution. A bus 690 carries the data to system RAM or another memory 620, from which a processor 610 retrieves and executes the instructions. The instructions received by system RAM or another memory 620 can optionally be stored on a fixed disk (mass storage device 630/portable storage 640) either before or after execution by processor 610. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for curating streamed views of virtual environments, the method comprising:
   generating a shared virtual environment accessible by a plurality of spectator devices over a communication network, each of the plurality of devices controlling a streamed view within the shared virtual environment in accordance with a plurality of view modification options;
   receiving input from a requesting spectator device over the communication network, the input selecting a view curator of a plurality of view curators for the shared virtual environment;
   handing off control over a streamed view associated with the requesting spectator device to the selected view curator, wherein the selected view curator controls switching between the plurality of view modification options for devices that have handed off control to the selected view curator;

receiving one or more control inputs from the selected view curator, each control input selecting a different view modification option from the plurality of view modification options;

modifying the streamed view associated with the requesting spectator device in accordance with the control inputs from the selected view curator; and providing the modified streamed view to the requesting spectator device over the communication network.

2. The method of claim 1, wherein the received input from the requesting spectator device further selects partial or total control to be handed off to the view curator, and wherein control over the streamed view is handed off in accordance with the selection of partial or total control.

3. The method of claim 2, further comprising receiving one or more control inputs from the requesting spectator device that has selected partial control to be handed off to the view curator, wherein modifying the streamed view is further based on the control inputs received from the requesting spectator device.

4. The method of claim 1, wherein the selected view curator is at least one of a player participating in the shared virtual environment, a spectator associated with the requesting spectator device, another spectator, a commentator, and an artificial intelligence system.

5. The method of claim 1, wherein the control inputs specify modifications to at least one of a viewing angle, zoom, rotation, speed of the streamed view, replay of a portion of the streamed view, and incorporating external content.

6. The method of claim 5 wherein the external content includes at least one of audio, video, and textual commentary, and wherein modifying the streamed view includes providing a separate stream of the commentary to the requesting spectator device for incorporation into the streamed view.

7. The method of claim 1, further comprising:
receiving feedback inputs from one or more of the spectator devices;
identifying one or more different types of the received feedback inputs;
identifying when an amount of one of the feedback types corresponds to a predetermined threshold; and
generating an effect within the shared virtual environment based on the corresponding threshold.

8. The method of claim 7, wherein the different types of the received feedback inputs include positive or negative feedback, wherein the generated effects include an audio effect played for a predetermined time period, a type of the audio effect corresponding to the type of received feedback inputs.

9. The method of claim 7, wherein the different types of the received feedback inputs include indications of negative behavior specific to a player in the shared virtual environment, and wherein the effect includes replacing the player.

10. A system for curating streamed views of virtual environments, the system comprising:
a game management server that tracks data regarding a shared virtual environment accessible by a plurality of spectator devices over a communication network, each of the plurality of devices controlling a streamed view within the shared virtual environment in accordance with a plurality of view modification options;
a communication interface that communicates over the communication network, wherein the communication interface:
receives input from a requesting spectator device over the communication network, the input selecting a view curator of a plurality of view curators for the shared virtual environment, wherein the selected view curator is given control over a streamed view associated with the requesting spectator device;
hands off control over a streamed view associated with the requesting spectator device to the selected view curator, wherein the selected view curator controls switching between the plurality of view modification options for devices that have handed off control to the selected view curator; and
receives one or more control inputs from the selected view curator, each control input selecting a different view modification option from the plurality of view modification options; and
a processor that executes instructions stored in memory, wherein the processor executes the instructions to:
modify the streamed view associated with the requesting spectator device in accordance with the control inputs from the selected view curator; and
provide the modified streamed view to the requesting spectator device over the communication network.

11. The system of claim 10, wherein the received input from the requesting spectator device further selects partial or total control to be handed off to the view curator, and wherein control over the streamed view is handed off in accordance with the selection of partial or total control.

12. The system of claim 11, wherein the communication interface further receives one or more control inputs from the requesting spectator device that has selected partial control to be handed off to the view curator, wherein the processor modifies the streamed view further based on the control inputs received from the requesting spectator device.

13. The system of claim 10, wherein the selected view curator is at least one of a player participating in the shared virtual environment, a spectator associated with the requesting spectator device, another spectator, a commentator, and an artificial intelligence system.

14. The system of claim 10, wherein the control inputs specify modifications to at least one of a viewing angle, zoom, rotation, speed of the streamed view, replay of a portion of the streamed view, and incorporating external content.

15. The system of claim 14, wherein the external content includes at least one of audio, video, and textual commentary, and wherein the processor modifies the streamed view by providing a separate stream of the commentary to the requesting spectator device for incorporation into the streamed view.

16. The system of claim 10, wherein the communication interface further receives feedback inputs from one or more of the spectator devices; and wherein the processor executes further instructions to:
identify one or more different types of the received feedback inputs;
identify when an amount of one of the feedback types corresponds to a predetermined threshold; and
generate an effect within the shared virtual environment based on the corresponding threshold.

17. The system of claim 16, wherein the different types of the received feedback inputs include positive or negative feedback, wherein the generated effects include an audio effect played for a predetermined time period, a type of the audio effect corresponding to the type of received feedback inputs.

18. The system of claim 16, wherein the different types of the received feedback inputs include indications of negative behavior specific to a player in the shared virtual environment, and wherein the effect includes replacing the player.

19. A non-transitory computer-readable storage medium having embodied thereon a program executable by a processor to perform a method for curating streamed views of virtual environments, the method comprising:

generating a shared virtual environment accessible by a plurality of spectator devices over a communication network, each of the plurality of devices controlling a streamed view within the shared virtual environment in accordance with a plurality of view modification options;

receiving input from a requesting spectator device over the communication network, the input selecting a view curator of a plurality of view curators for the shared virtual environment;

handing off control over a streamed view associated with the requesting spectator device to the selected view curator, wherein the selected view curator controls switching between the plurality of view modification options for devices that have handed off control to the selected view curator;

receiving one or more control inputs from the selected view curator, each control input selecting a different view modification option from the plurality of view modification options;

modifying the streamed view associated with the requesting spectator device in accordance with the control inputs from the selected view curator; and providing the modified streamed view to the requesting spectator device over the communication network.

* * * * *